United States Patent

Söderhäll

Patent Number: 6,153,949
Date of Patent: Nov. 28, 2000

[54] ELECTRICAL POWER MANAGEMENT SYSTEM PROVIDING MOMENTARILY HIGH POWER TO A LOAD

[75] Inventor: Anders Söderhäll, Stockholm, Sweden

[73] Assignee: Telefonaktiebolaget LM Ericsson, Stockholm, Sweden

[21] Appl. No.: 09/268,836

[22] Filed: Mar. 16, 1999

[30] Foreign Application Priority Data

Mar. 17, 1998 [SE] Sweden ................................ 9800889

[51] Int. Cl.[7] .................................................. H02J 9/06
[52] U.S. Cl. ........................... 307/125; 307/66; 307/85
[58] Field of Search ................................ 307/125, 64–66, 307/85–87, 130

[56] References Cited

U.S. PATENT DOCUMENTS

| | | | |
|---|---|---|---|
| 4,860,185 | 8/1989 | Brewer et al. | 363/41 |
| 5,185,536 | 2/1993 | Johnson, Jr. et al. | 307/66 |
| 5,229,650 | 7/1993 | Kita et al. | 307/66 |
| 5,631,503 | 5/1997 | Cioffi | 307/66 |
| 5,650,669 | 7/1997 | Aldous | 307/66 |
| 5,784,626 | 7/1998 | Odaohara | 307/66 |

FOREIGN PATENT DOCUMENTS

| | | |
|---|---|---|
| 0 183 597 A1 | 6/1986 | European Pat. Off. |
| 09051303 | 2/1997 | Japan . |
| WO 92/05614 | 4/1992 | WIPO . |
| WO 92/12563 | 7/1992 | WIPO . |
| WO 97/31423 | 8/1997 | WIPO . |

OTHER PUBLICATIONS

Nordenberg, B.; International-Type Search Report; Search Request No. SE 98/00213; Feb. 1, 1999; pp. 1–3.

*Primary Examiner*—Fritz Fleming
*Attorney, Agent, or Firm*—Jenkens & Gilchrist, P.C.

[57] ABSTRACT

An electrical power management system (300) is disclosed comprising a power supply (301) which, when a first switch (302) and a third switch (306) are closed, provides power to a DC-DC step up converter (303) which, in turn, supplies power to a load (310) and simultaneously stores energy in a capacitor (305). In the case where the load momentarily requires more power than can be provided by the power supply, the first switch (302) and the third switch (306) are opened and a second switch (304) is closed. Energy previously stored in the capacitor (305) is now provided to the DC-DC step up converter (303) thereby allowing an efficient use of energy stored in the capacitor.

12 Claims, 4 Drawing Sheets

ELECTRICAL POWER MANAGEMENT SYSTEM PROVIDING MOMENTARILY HIGH POWER TO A LOAD

TECHNICAL FIELD OF INVENTION

The invention relates to an electrical power management system and, in particular, to an electrical power management system providing momentarily high power. This kind of power management systems are found in, for example, radio devices requiring momentarily high power during transmission.

DESCRIPTION OF RELATED ART

A first known form of an electrical power management system comprises a power supply providing a voltage to a DC-DC step up converter. The voltage at the output of the DC-DC step up converter provides power to a radio transmitter. To handle momentarily high power demands from the transmitter the output voltage of the power supply provides energy to a capacitor. When the transmitter momentarily uses more energy than can be supplied by the power supply alone, energy stored in the capacitor will be provided to the DC-DC converter in addition to the power supplied by the power supply.

A second known form of an electrical power management system is disclosed in the U.S. Pat. No. 5,650,669 by Aldous. In this case the capacitor is connected at the output of the DC-DC step up converter instead of at the input of the DC-DC step up converter. Alternatively, a battery can be used instead of the capacitor.

Whilst the known electrical power management systems described above function quite adequately, they do have a number of disadvantages.

The drawback of these known constructions is that only a very small portion of the energy stored in the capacitor can be used to assist the power supply in supplying power to a load which momentarily requires high power.

If it is assumed, referring to the above described first known electrical management system, that the power supply provides an output voltage of 5V and that this output voltage is allowed to drop by 100 mV then only 4% of the energy that can be stored in the capacitor can be used to provide power to the DC-DC step up converter.

Similarly, if it is assumed, referring to the above described second known electrical management system, that the output voltage of the DC-DC step up converter provides an output voltage of 5V and that this output voltage is allowed to drop by 100 mV then, again, only 4% of the energy that can be stored in the capacitor can be used to provide power to the transmitter. Also in the case where a battery is used instead of a capacitor only a small amount of the energy that can be stored in the battery can be used to provide power to the transmitter.

Due to this low efficiency of energy usage a large capacitance must be used to provide a sufficiently large energy buffer. A capacitor having a large capacitance is both expensive and occupies a large physical volume. The large volume becomes a pronounced problem when the capacitor is incorporated in a small application, such as in a PCMCIA card preferably together with a radio and a modem.

It is an object of the present invention to provide an electrical power management system which overcomes or alleviates the above mentioned problem.

SUMMARY

According to an aspect of the present invention there is provided an electrical power management system comprising a DC-DC converter having an input for receiving a first voltage and having an output for providing a second voltage, an energy storing means, a first switch which when being in a closed state connects the input of the DC-DC converter to the energy storing means, a second switch which when being in a closed state connects the output of the DC-DC converter to the energy storing means and a power management controller for controlling the operation of the first switch and the second switch such that, when the system is in use, the energy storing means is being charged with energy when it is connected to the output of the DC-DC converter and the energy storing means is supplying energy to the DC-DC converter when it is connected to the input of the DC-DC converter.

This construction achieves the advantage that a large amount of the energy that can be stored in the energy storing means can be provided to the DC-DC converter and, consequently, to a load.

Preferably, the electrical power management system comprises an input terminal for receiving a supply voltage and a third switch which when being in a closed state connects the input terminal to the input of the DC-DC converter. The operation of the third switch is controlled by the power management controller such that, when the system is in use, the supply voltage is provided to the input of the DC-DC converter when the third switch is closed and the DC-DC converter is disconnected from the supply voltage when the third switch is opened.

The advantage of this is that the power management system can be disconnected from the power supply when a load momentarily requires high power. If other devices are supplied with power from the power supply there is no risk that these are disturbed at these moments.

According to another aspect of the present invention there is provided a radio communication device comprising a power management system according to the present invention and a radio transmitter for transmitting a radio signal. The radio transmitter is supplied with electrical power from the output of the DC-DC converter. Furthermore, and a radio controller controls the operation of the transmitter.

The advantage of this is that a transmitter of a radio communication device, which momentarily transmits with high power, can be incorporated in a small application.

The advantage that a large amount of the energy that can be stored in the energy storing means can be provided to the DC-DC converter is achieved by allowing the energy storing means to be charged with energy when it is connected to the output of the DC-DC converter and by allowing it to supply energy to the input of the DC-DC converter when it is connected to the input of the DC-DC converter. Since the input voltage provided to the DC-DC converter may vary within a relatively large range, e.g. 3V to 5V, the energy storing means can supply a relatively large amount of energy to the DC-DC converter and, consequently, to a load.

The advantage that the power management system can be disconnected from the power supply when a load momentarily requires high power is achieved by the third switch which can disconnect the power supply from the input of the DC-DC converter.

The advantage that a transmitter of a radio communication device, which momentarily transmits with high power, can be incorporated in a small application is achieved by combining the electrical power management system with a radio communication device.

DETAILED DESCRIPTION OF EMBODIMENTS

Figure 1:
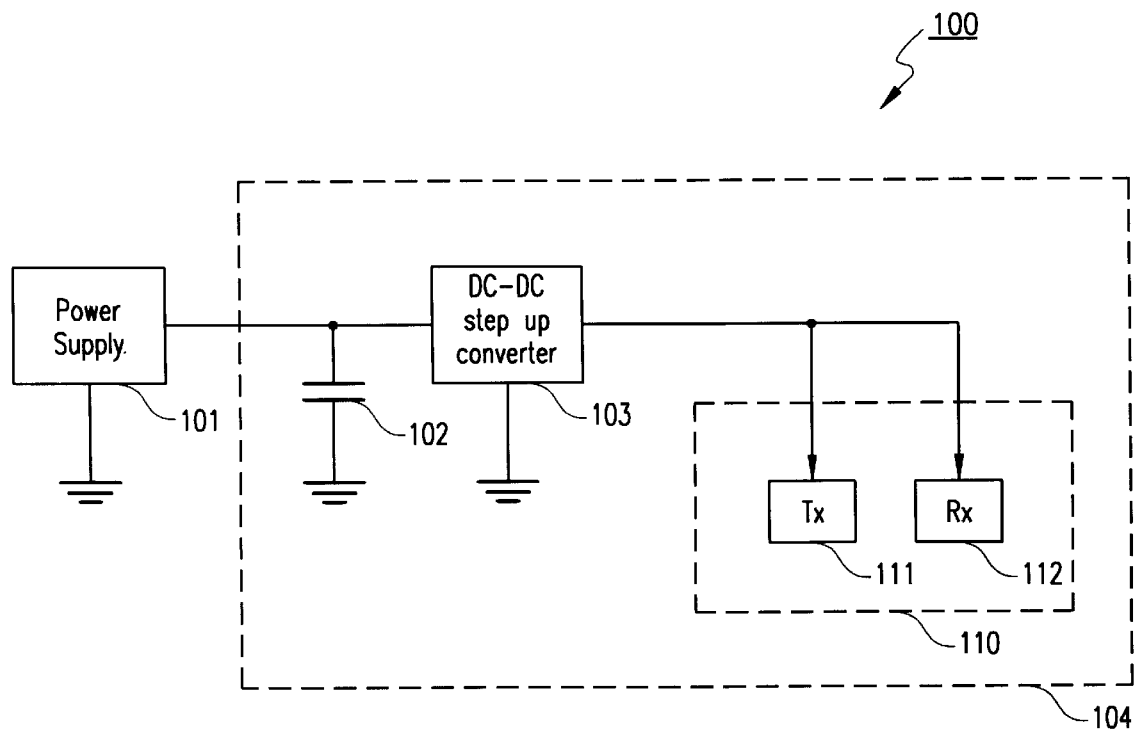
FIG. 1 shows a block diagram of a prior art electrical power management system.

FIG. 1 shows a block diagram of a prior art electrical power management system 100. A power supply 101 is connected to a first terminal of a capacitor 102 and to an input terminal of a DC-DC step up converter 103. The second terminal of the capacitor 102 is connected to ground potential. The output terminal of the DC-DC step up converter 103 is connected to a load 110. In this example, the load 110 comprises a radio transmitter 111 and a radio receiver 112.

Figure 2:
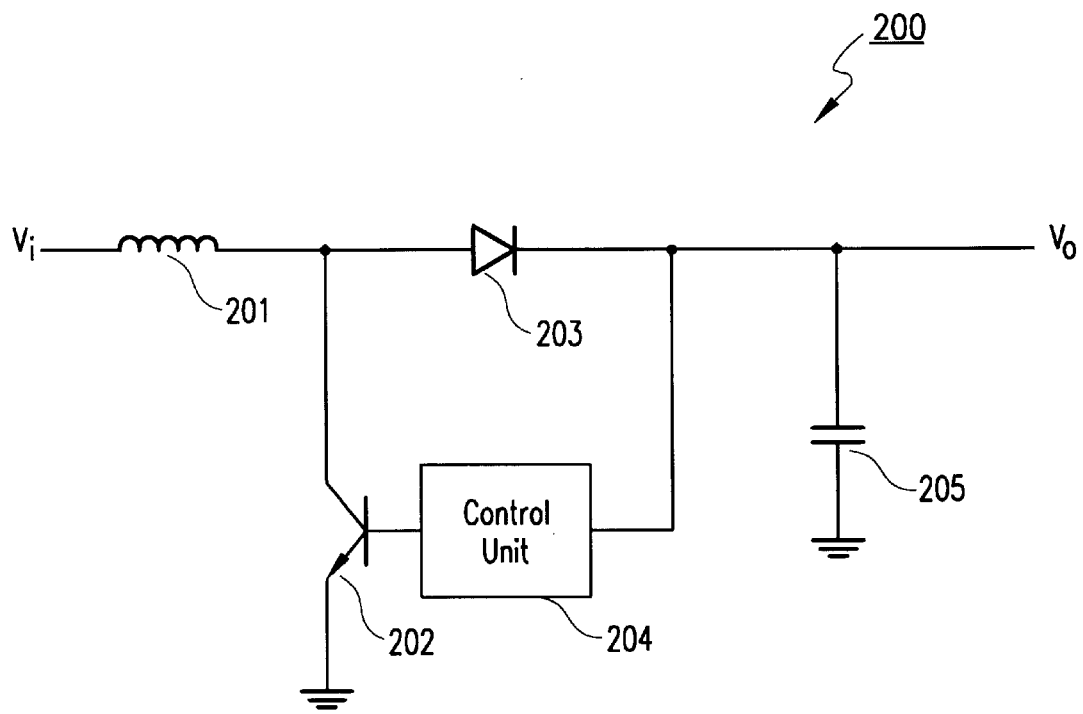
FIG. 2 shows a block diagram of a DC-DC step up converter.

FIG. 2 shows a block diagram of a DC-DC step up converter 200. An input terminal for receiving an input voltage, $v_i$, is connected to a first terminal of an inductor 201. The second terminal of the inductor 201 is connected to the collector of a bipolar transistor 202 and to the anode of a diode 203. The cathode of the diode 203 is connected to an output terminal for delivering an output voltage, $v_o$, and to an input of a control unit 204 and to a first terminal of a capacitor 205. An output of the control unit is connected to the base of the transistor 202. The emitter of the transistor 202 and the second terminal of the capacitor 205 are connected to ground potential.

The operation of the DC-DC step up converter 200 is well known in the art. In principle, the transistor 202 acts as a switch which is under control of the control unit 204. When the transistor 202 is conducting, energy is stored in the inductance 201. This energy is provided to the output terminal through the diode 203 when the switch opens. Due to the properties of the inductor the voltage provided at the output can have a greater nominal value compared to the nominal value of the voltage at the input terminal. The control unit 204 measures the voltage at the output terminal and adjusts the switching of the transistor 202 such that an output voltage having a pre-determined nominal value is generated at the output terminal. A particular advantage of a DC-DC step up converter is that the pre-determined nominal value of the output voltage may be achieved though the input voltage is within a relatively large range. For example, a DC-DC step up converter providing an output voltage of 5V may allow the input voltage to vary in the range of 3V to 5V.

Returning to the electrical power management system of FIG. 1 and the operation thereof the power supply 101 provides an output voltage, e.g. 3V. The capacitor 102 is then charged with energy, $W_m$. If the output voltage of the power supply is 3V, the energy stored in the capacitor is equal to:

$$W_m = C \times 3^2/2 \text{ [Joule]}$$

i.e. $W=(C \times U^2)/2$ where C is the capacitance of the capacitor 102 and U is the voltage applied over the capacitor. The DC-DC step up converter 103 provides an output voltage, e.g. 5V, which then is greater than the input voltage, and the output voltage is provided to the load 110.

In an example, the power supply 101 forms part of a lap-top computer (not shown). Often the power supply comprises a rechargeable battery pack. The lap-top computer is powered either from the mains connected to the lap-top computer (thereby simultaneously charging the battery pack) or from the battery pack itself. In many contemporary lap-top computers additional devices may be connected to one or several connectors of the lap-top computer. One kind of such connectors allows the user to connect a PCMCIA card. The PCMCIA card has a standardized physical format and a pre-defined electrical connection architecture. An example of a PCMCIA card is a flash memory card allowing the user to store data in a non-volatile memory (not shown) on the PCMCIA card. In another example, a modem is provided together with a cellular phone, e.g. a GSM phone, on the PCMCIA card. Such a PCMCIA card is illustrated in FIG. 1 by the dashed line 104 and the cellular phone is illustrated by the transmitter 111 and the receiver 112. Other parts of the modem and the cellular phone have been left out in order to make the figure more readable. In this kind of applications the cellular phone often consumes momentarily more power, i.e. during radio transmission, than what can be supplied by the power supply 101 of the lap-top computer. For example, the power supply of the lap-top computer may supply a continuous current in the range of 30 mA to 1 A at its PCMCIA connector. The radio transmitter 111 of the cellular phone, however, may need 2 A during transmission. Since the radio transmitter 111 does only transmit during short periods of time the average power consumption by the load 110 is far less than 2 A. Therefore, the capacitor 102 provides an energy buffer allowing the transmitter 111 of the cellular phone to consume momentarily more power than the maximum output power of the power supply 101. Without the energy buffer provided by the capacitor 102 the output voltage of the power supply would drop significantly during the transmission periods or the power supply would even break. Such a drop in output voltage may disturb the operation not only of the cellular phone but also of the lap-top computer itself. Assuming that the output voltage provided by the power supply (3V in this example) is allowed to drop by 100 mA, the amount of energy which can be provided by a fully charged capacitor, $W_a$, can be calculated:

$$W_a = C \times (3^2 - 2.9^2)/2$$

More interesting is to relate this amount of energy to the amount of energy of a fully charged capacitor, i.e. $W_m = C \times 3^2/2$ thereby calculating the efficiency of energy usage, $\eta_w$:

$$\eta_w = W_a/W_m = (3^2 - 2.9^2)/3^2 = 6.6\%$$

This means that only 6.6% of the energy stored in a fully charged capacitor 102 can be used to assist the power supply in providing power to the load 110. If the output voltage of the power supply is 5V instead of 3V the efficiency of energy usage becomes as low as 4.0%.

A problem of the prior art electrical management system is that a capacitor 102 having a large capacitance must be used to provide a sufficiently large energy buffer in this kind of applications. A capacitor having a large capacitance is both expensive and occupies a large physical volume. The large volume becomes a pronounced problem when the capacitor is incorporated in a small application such as in a PCMCIA card preferably also incorporating a radio and a modem.

Figure 3:
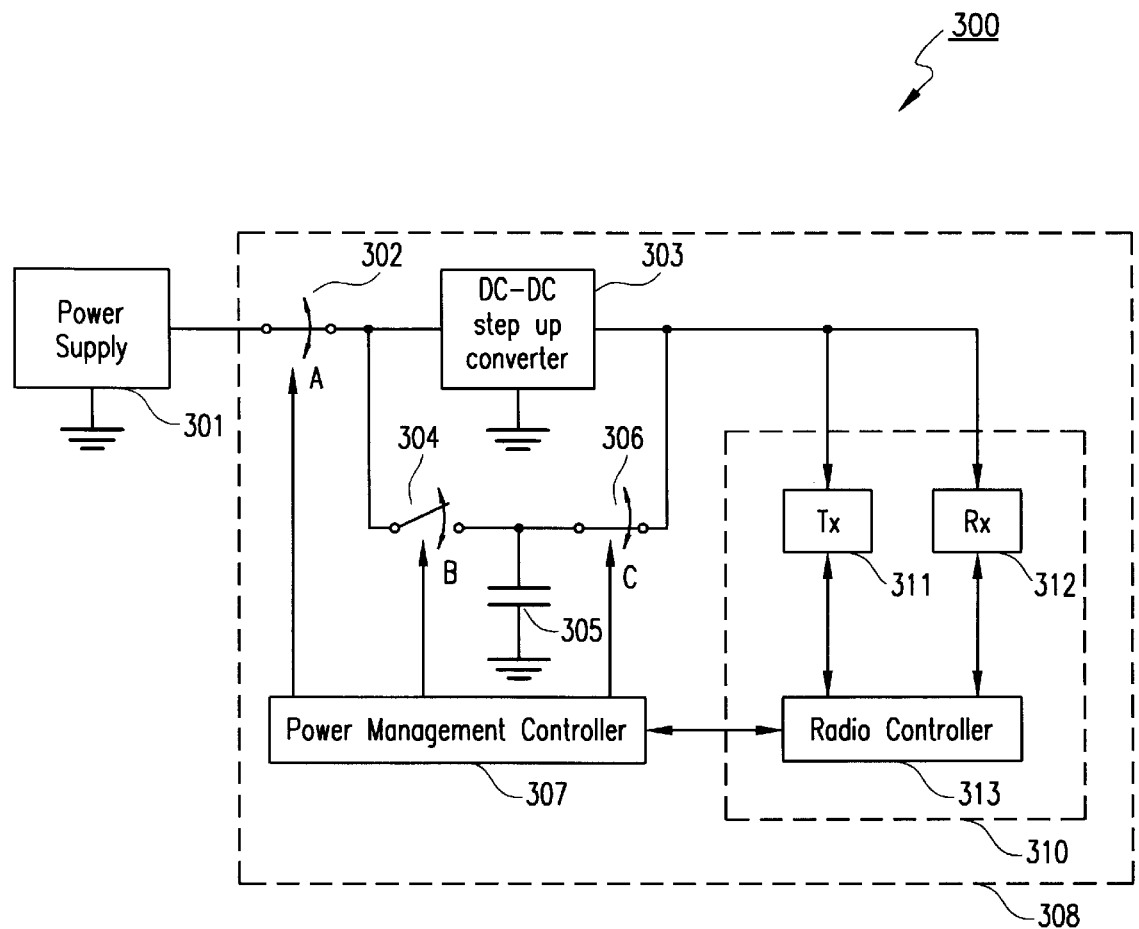
FIG. 3 shows a block diagram of an electrical power management system according to a first embodiment of the present invention in a first operational mode.
Figure 4:
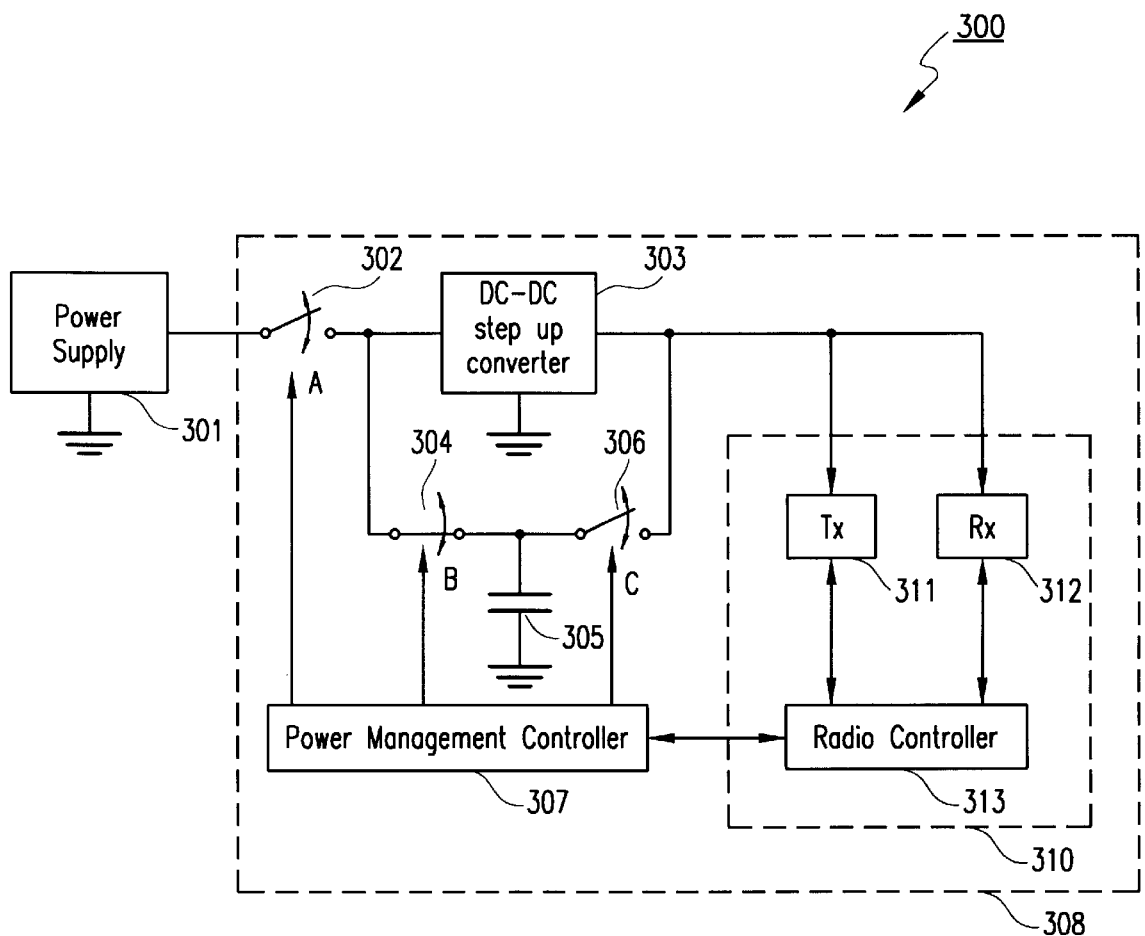
FIG. 4 shows a block diagram of an electrical power management system according to a first embodiment of the present invention in a second operational mode.

FIG. 3 and FIG. 4 show block diagrams of an electrical power management system 300 according to a first embodiment in a first and a second operational mode, respectively. A power supply 301 is connected to a first terminal of a first switch 302. A second terminal of the first switch is connected to an input of a DC-DC step up converter 303 and to a first terminal of a second switch 304. A second terminal of the second switch is connected to a first terminal of a capacitor 305 and to a first terminal of a third switch 306. The second terminal of the capacitor 305 is connected to ground potential. A second terminal of the third switch 306 is connected to the output of the DC-DC step up converter 303 and to the load 310. The load in this example comprises a radio whereof the transmitter 311, the receiver 312 and the radio controller 313 are shown in FIG. 3 and FIG. 4. The other elements of the radio and the modem connected thereto are not shown. The first switch 302, the second switch 304 and the third switch 306 are controlled by a power management controller 307 as illustrated by the arrows A, B and C, respectively, in FIG. 3 and FIG. 4. The radio controller is connected to the transmitter 311, the receiver 312 and the power management controller 307. In this embodiment the three switches 302, 304 and 306, the DC-DC step up converter 303, the capacitor 305, the power management controller 307 and the load 310 are implemented on a PCMCIA card constituting a radio communication device illustrated by the dashed line 308 in FIG. 3 and FIG. 4. The power management controller 307 and the radio controller 313 are preferably supplied with power (not shown) from the output terminal of the DC-DC step up converter 303.

The first, second and third switches, 302, 304 and 306, may be implemented, for example, by means of bipolar transistors or field effect transistors (FET).

In a first mode of operation, illustrated in FIG. 3, the first switch 302 and the third switch 306 are closed while the second switch is opened. The power supply 301 generates an output voltage, e.g. 3V, which is provided to the DC-DC step up converter 303 through the closed first switch 302. The DC-DC step up converter 303 creates an output voltage which has a larger nominal value, e.g. 5V, than the nominal value of the output voltage of the power supply. The output voltage of the DC-DC converter 303 is provided to the load 310 as well as to the capacitor 305 through the closed third switch 306. The output voltage of the DC-DC converter 303 is, however, not provided to the input of the DC-DC converter 303 because the second switch is opened. In this first mode of operation the voltage over the capacitor 305 is equal to the output voltage of the DC-DC step up converter and the capacitor is then charged.

When the load 310 momentarily needs more power than what the power supply 301 can supply, the power management controller 307 opens the first switch 302 and the third switch 306 and closes the second switch 304. This corresponds to a second mode of operation and is illustrated in FIG. 4. The elements of the power management system implemented on the PCMCIA card are now disconnected from the power supply 301 because the first switch is opened. Instead, the DC-DC step up converter 303 is supplied with energy from the capacitor 305 which was charged with energy during the first mode of operation. Note that the energy of the capacitor is not discharged directly to the load 310 because the third switch 306 is now opened. In the case where the load comprises a radio, as is illustrated in FIG. 3 and FIG. 4, the radio controller 313, which controls the operation of the transmitter 311 and the receiver 312, gives the power management controller 307 information that it intends to activate the transmitter 311 and information representing the period of time transmission will occur. The power management controller 307 then enters the second mode of operation during the transmission period thereby allowing the transmitter to be powered by the energy previously stored in the capacitor 305.

The advantage of the power management system of the present invention is illustrated by some calculations. Assume that the power supply 301 provides an output voltage of 3V and that the DC-DC step up converter 303 provides an output voltage of 5V. The energy stored in the capacitor 305 during the first mode of operation, $W_1$, is:

$$W_1 = C \times 5^2/2$$

Furthermore, as discussed above, assuming that the DC-DC step up converter 303 allows the input voltage thereof to be in the range of 3V to 5V, the maximum amount of energy, $W_2$, which can be discharged from the capacitor 305 during the second mode of operation, without departing from this range, is:

$$W_2 = C \times (5^2 - 3^2)/2$$

The efficiency of energy usage of this embodiment, $\eta_{w1}$ can now be calculated:

$$\eta_{w1} = W_2/W_1 = (5^2 - 3^2)/5^2 = 64\%$$

After the capacitor has been partly discharged during the second mode of operation, the first mode of operation is entered and the capacitor will be recharged again. Initially a large current flows into the capacitor when the first mode is entered. To avoid this a current limiter (not shown), such as a resistor, is introduced between the output of the DC-DC step up converter 303 and the second terminal of the third switch 306. The maximum voltage over the capacitor is then reduced from 5V to, for example, 4.8V. Furthermore, a safety margin may be introduced such that the voltage over the capacitor 305 does not fall below 3.3V. The efficiency of energy usage will then be:

$$\eta_{w1} = W_2/W_1 = (4.8^2 - 3.3^2)/4.8^2 = 53\%$$

As is illustrated by the calculations, the efficiency of energy usage of the energy stored in the capacitor 305 of the power management system of the present invention is increased compared to the efficiency of energy usage of the energy stored in the capacitor 102 of the prior art. Comparing the particular examples the efficiency of energy usage is increased from merely 4% to more than 50%. A correspondingly smaller capacitance value of the capacitor 305 may be chosen which also results in a smaller and cheaper capacitor. A smaller and cheaper implementation is therefore allowed by the power management system of the present invention compared to the system of the prior art.

It should be understood that other energy storing means than a capacitor can be used, e.g. a battery. Although the calculations can not be directly transferred to other energy storage means the same advantages will be achieved.

Elements of the PCMCIA card which do not momentarily need more power than what can be supplied by the power supply 301 may continuously be connected to the output terminal of the power supply 301.

Moreover, the elements of the power management system may be implemented in different units, e.g. devices or cards. For example, if the power supply is implemented in a lap-top computer, any other element of the power management system may be implemented in the lap-top computer or on the PCMCIA card.

Furthermore, the power supply 101 may form part of any kind of electrical device, for example electronic organizers, palm computers, video cameras (camcorders), still cameras, or constitute a separate power supply unit. Any kind of cellular radio system may be used, such as GSM, DECT, AMPS, DAMPS, CDMA, WCDMA, TD-CDMA. In fact any kind of radio may be used.

Several alternative implementations to the DC-DC converter 200 in FIG. 2 are known in the art. The particular implementation in an application is chosen according to well known principles.

What is claimed is:

1. An electrical power management system, comprising:
   a DC-DC converter having an input for receiving a first voltage and having an output for providing a second voltage;
   an energy storing unit;
   an input terminal for receiving a supply voltage;
   a first switch which when being in a closed state connects the input of the DC-DC converter to the energy storing unit;
   a second switch which when being in a closed state connects the output of the DC-DC converter to the energy storing unit;
   a third switch which when being in a closed state connects the input terminal to the input of the DC-DC converter; and
   a power management controller for controlling operation of the first switch, the second switch and the third switch such that, when the system is in use, the supply voltage is being connected to and disconnected from the input of the DC-DC converter when the third switch is closed and opened, respectively, the energy storing unit is being charged with energy when it is connected to the output of the DC-DC converter and the energy storing unit is supplying energy to the DC-DC converter when it is connected to the input of the DC-DC converter.

2. An electrical power management system according to claim 1 wherein the power management controller further includes:
   a controller input for receiving control signals,
   wherein the power management controller, when the system is in use, is controlling the first switch to be opened and the second switch to be closed in response to a first control signal at the controller input and is controlling the first switch to be closed and the second switch to be opened in response to a second control signal at the controller input.

3. An electrical power management system according to claim 2 wherein the power management controller, when the system is in use, is further configured to cause the third switch to be closed in response to the first control signal and the third switch to be opened in response to the second control signal.

4. An electrical power management system of claim 2, further comprising:
   a radio transmitter for transmitting a radio signal, the radio transmitter being supplied with electrical power from the output of the DC-DC converter; and
   a radio controller for controlling operation of the transmitter.

5. An electrical power management system according to claim 4 wherein an output control signal of the radio controller is connected to the controller input of the power management controller and, when the transmitter is in use, the radio controller is configured to selectively change from providing the first control signal to providing the second control signal to the controller input of the power management controller at a moment before the transmitter starts transmitting.

6. An electrical power management system according to claim 4 implemented on a PCMCIA card.

7. An electrical power management system according to claim 1 wherein the energy storing unit includes a capacitor.

8. An electrical power management system according to claim 1 wherein the energy storing unit includes a battery.

9. An electrical power management system comprising:
   a DC-DC converter having an input for receiving a first voltage and having an output for providing a second voltage;
   an energy storing unit;
   a first switch which when being in a closed state connects the input of the DC-DC converter to the energy storing unit;
   a second switch which when being in a closed state connects the output of the DC-DC converter to the energy storing unit;
   a third switch which when being in a closed state connects the input of the DC-DC converter to the first voltage; and
   a power management controller for controlling the operation of the first switch, the second switch, and the third switch such that, in a first mode of operation, the first voltage is connected to the input of the DC-DC converter and the output of the DC-DC converter is connected to the energy storing unit by closing the second switch and the third switch, and, in a second mode of operation, the energy storing unit is connected to the input of the DC-DC convertor and is supplying energy thereto by closing the first switch.

10. An electrical power management system according to claim 9, wherein in the second mode of operation, the first voltage is disconnected from the input of the DC-DC converter by opening the third switch.

11. A method for use in an electrical power management system, the method comprising:

switchably connecting a supply voltage to a first DC voltage;

converting the first DC voltage to a second DC voltage using a converter unit;

storing energy in an energy storing unit by switchably connecting the second DC voltage to the energy storing unit; and removing energy from the energy storing unit by switchably disconnecting the supply voltage from the first DC voltage and switchably connecting the first DC voltage to the energy storing unit, and wherein the energy storage unit is not connected to both the first DC voltage and the second DC voltage at the same time.

12. A method for use in an electrical power management system according to claim 11 wherein the steps of storing energy in an energy storing unit by switchably connecting the second DC voltage to the energy storing unit, and removing energy from the energy storing unit by switchably connecting the first DC voltage to the energy storing unit further include:

controllably establishing a first mode of operation, wherein the first DC voltage is connected to an input terminal of the converter unit and not connected to the energy storage unit, and the second DC voltage from an output terminal of the converter unit is connected to an input terminal of the energy storing unit; and controllably establishing a second mode of operation, wherein an output terminal of the energy storing unit is connected to an input terminal of the converter unit, and wherein the first and second modes of operation are not established at the same time.

\* \* \* \* \*